(12) United States Patent
Kambayashi et al.

(10) Patent No.: US 7,458,090 B2
(45) Date of Patent: *Nov. 25, 2008

(54) METHOD AND APPARATUS OF DISPLAYING BIT STREAM DATA, METHOD AND APPARATUS FOR GENERATING BIT STREAM DATA, AND STORAGE MEDIUM

(75) Inventors: Toru Kambayashi, Chigasaki (JP); Tatsunori Kanai, Yokohama (JP); Takeshi Saito, Tokyo (JP); Hiroshi Yao, Kawasaki (JP); Shigeyasu Natsubori, Yokohama (JP); Osamu Hori, Yokohama (JP); Toshimitsu Kaneko, Yokohama (JP); Toshihiro Morohoshi, Kawasaki (JP); Takahiro Harashima, Sagamihira (JP); Yoshinori Suzuki, Yokohama (JP); Shigeru Oyanagi, Yokohama (JP); Takeshi Aikawa, Tokyo (JP)

(73) Assignee: Kabushiki Kaisha Toshiba, Kawasaki-shi (JP)

( * ) Notice: Subject to any disclaimer, the term of this patent is extended or adjusted under 35 U.S.C. 154(b) by 1363 days.

This patent is subject to a terminal disclaimer.

(21) Appl. No.: 10/247,510

(22) Filed: Sep. 20, 2002

(65) Prior Publication Data

US 2003/0025829 A1 Feb. 6, 2003

Related U.S. Application Data

(63) Continuation of application No. 09/096,193, filed on Jun. 12, 1998, now Pat. No. 6,473,901.

(30) Foreign Application Priority Data

Jun. 12, 1997 (JP) ................................. 9-155460

(51) Int. Cl.
*H04N 7/20* (2006.01)
*H04N 7/16* (2006.01)
*H04N 7/00* (2006.01)
*H04N 5/92* (2006.01)

(52) U.S. Cl. ............................. 725/70; 386/46; 386/66; 386/83

(58) Field of Classification Search ....................... None
See application file for complete search history.

(56) References Cited

U.S. PATENT DOCUMENTS 5,448,568 A * 9/1995 Delpuch et al. .......... 348/423.1

(Continued)

FOREIGN PATENT DOCUMENTS

EP 0 854 649 A2 7/1998

(Continued)

OTHER PUBLICATIONS

Morita et al. "Development of IT Vision Receiver," Technical Report of Institute of Television, Institute of Television, Nov. 15, 1996, vol. 20, No. 58 pp. 19-24.
Takashima et al. "Interactive TV—Two-Way TV by Intertext System," Toshiba Review, Toshiba Corporation, Oct. 1, 1996, vol. 51, No. 10, pp. 8-11.

*Primary Examiner*—Christopher Grant
*Assistant Examiner*—Oschta Montoya
(74) *Attorney, Agent, or Firm*—Foley & Lardner LLP

(57) ABSTRACT

According to a data display method, data having a program unit and instruction data for the program unit multiplexed on bit stream data is received. The program unit is extracted from the received data and is stored in a memory. The instruction data is extracted from the received data, and the program unit or part thereof specified by the instruction data is read from the memory and is executed. Then, the bit stream data and the execution result are displayed. This ensures smooth synchronization of reproduction of a bit stream with execution of an associated program and efficient use of resources.

13 Claims, 18 Drawing Sheets

U.S. PATENT DOCUMENTS

| | | | |
|---|---|---|---|
| 5,532,752 A | 7/1996 | Miyano | |
| 5,754,241 A | 5/1998 | Okada et al. | |
| 5,771,334 A | 6/1998 | Yamauchi et al. | |
| 5,781,599 A | 7/1998 | Shiga | |
| 5,819,034 A * | 10/1998 | Joseph et al. | 709/201 |
| 5,854,873 A | 12/1998 | Mori et al. | |
| 5,880,720 A | 3/1999 | Iwafune et al. | |
| 6,092,107 A | 7/2000 | Eleftheriadis et al. | |
| 6,097,758 A | 8/2000 | Monnier | |
| 6,473,901 B1 | 10/2002 | Kambayashi et al. | |

FOREIGN PATENT DOCUMENTS

| | | |
|---|---|---|
| JP | 5-174450 A | 7/1993 |
| JP | 6-319140 A | 11/1994 |
| JP | 08-006878 A | 1/1996 |
| JP | 9-93562 A | 4/1997 |
| JP | 10-262226 A | 9/1998 |
| JP | 11-004417 A | 1/1999 |
| WO | WO 97/07511 A1 | 2/1997 |

* cited by examiner

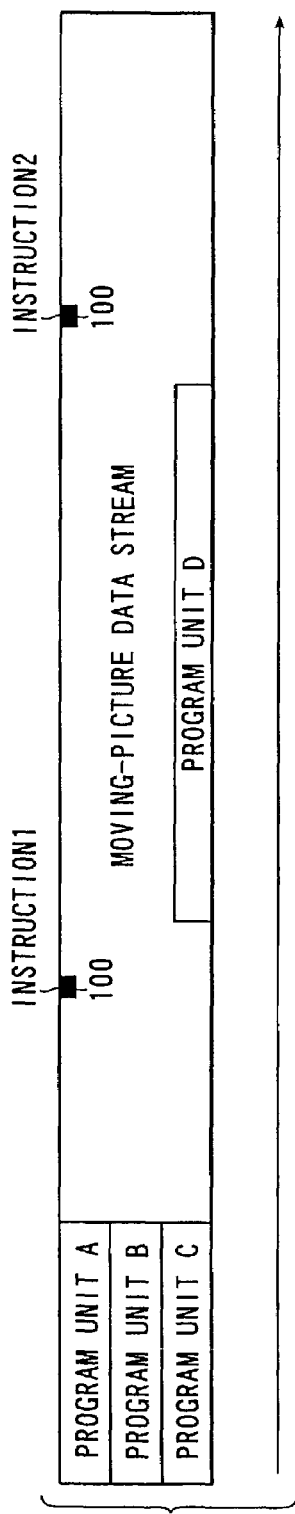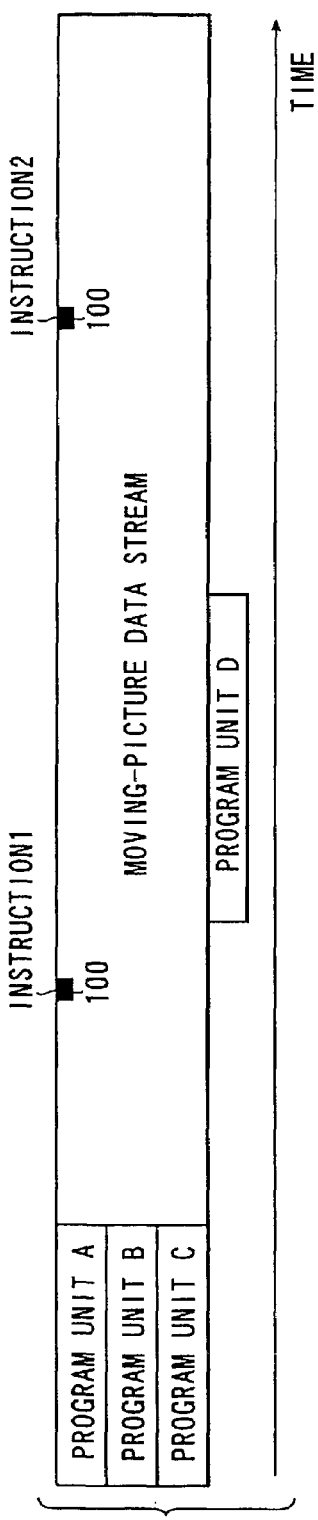
FIG. 3A
FIG. 3B

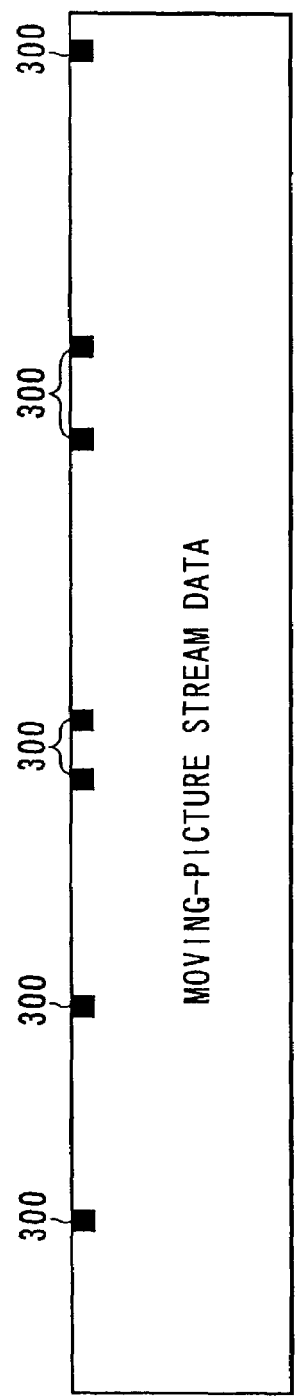
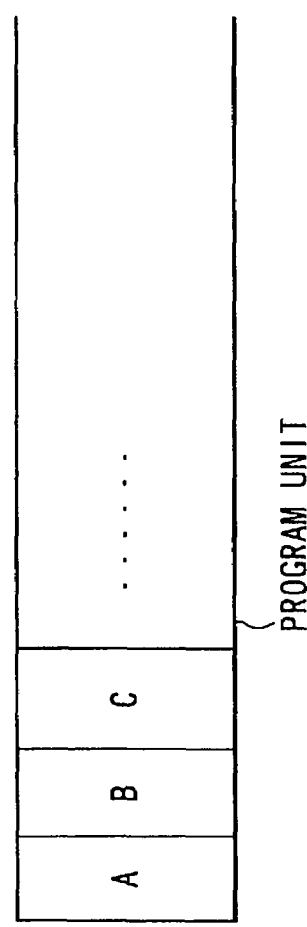

METHOD AND APPARATUS OF DISPLAYING BIT STREAM DATA, METHOD AND APPARATUS FOR GENERATING BIT STREAM DATA, AND STORAGE MEDIUM

BACKGROUND OF THE INVENTION

The present invention relates to a method and apparatus of displaying bit stream data, a method and apparatus for generating bit stream data, and a storage medium.

In an apparatus which displays bit stream data (e.g., a moving-picture bit stream or audio bit stream; the moving-picture bit stream may be accompanied with speeches), it is required to execute a related program in synchronism with the display operation.

In a case of dealing with multimedia data which consists of a mixture of a moving-picture bit stream and a program, for example, displaying moving pictures may be synchronized with execution of a program in the following manner.

(a) A moving-picture bit stream is adequately read out and displayed on the display screen accompanied with execution of a program.

(b) The program detects the end of image display and starts the next operation.

The following problems however arise when multimedia data consisting of a mixture of a moving-picture bit stream and a program is broadcast and reproduced in real time, or when multimedia data consisting of a mixture of a moving-picture bit stream and a program is read out from a storage medium like DVD and reproduced in a time sequential order.

(a) At the time of reproducing moving pictures accompanied with the program execution, reception or reading of moving-picture bit stream data has not been completed yet.

(b) When image display is finished, reception or reading of a program to be executed has not been completed yet.

Further, since it is not known when a program code will be invoked, every program code must always stand by for execution. This leads to such a disadvantage that a reception terminal requires a vast amount of resources.

BRIEF SUMMARY OF THE INVENTION

Accordingly, it is an object of the present invention to provide a method and apparatus of displaying bit stream data, a method and apparatus for generating bit stream data, and a storage medium, all of which ensure smooth synchronization of reproduction of a bit stream with execution of an associated program and efficient use of resources.

According to one aspect of the present invention, there is provided a data display method comprising the steps of: receiving data having a program unit and instruction data for the program unit multiplexed on bit stream data; extracting the program unit from the received data and storing the extracted program unit in a memory; extracting the instruction data from the received data, reading the program unit or part thereof specified by the extracted instruction data from the memory, and executing the read program unit or the part thereof; and displaying the bit stream data and the execution result.

According to another aspect of the present invention, there is provided a data generating method comprising the steps of: determining a program unit to be used in association with bit stream data; determining instruction data for the program unit, which is to be embedded in the bit stream data in accordance with a timing for executing the program unit; and arranging the program unit and the instruction data in the bit stream data.

According to another aspect of the present invention, there is provided a storage medium storing computer-executable program code comprising: means for causing a computer to receive data having a program unit and instruction data for the program unit multiplexed on bit stream data; means for causing a computer to extract the program unit from the received data and store the extracted program unit in a memory; means for causing a computer to extract the instruction data from the received data, read the program unit or part thereof specified by the extracted instruction data from the memory, and execute the read program unit or the part thereof; and means for causing a computer to display the bit stream data and the execution result.

According to another aspect of the present invention, there is provided a storage medium storing computer-executable program code comprising: means for causing a computer to determine a program unit to be used in association with bit stream data; means for causing a computer to determine instruction data for the program unit, which is to be embedded in the bit stream data in accordance with a timing for executing the program unit; and means for causing a computer to arrange the program unit and the instruction data in the bit stream data.

According to another aspect of the present invention, there is provided a storage medium storing computer-readable data comprising: bit stream data; a program unit multiplexed on the bit stream data; and instruction data for the program unit, which is multiplexed at a position which comes later than a position of the program unit in the bit stream data.

According to another aspect of the present invention, there is provided a data display apparatus comprising: means for receiving data having a program unit and instruction data for the program unit multiplexed on bit stream data; means for extracting the program unit from the received data and storing the extracted program unit in a memory; means for extracting the instruction data from the received data, reading the program unit or part thereof specified by the extracted instruction data from the memory, and executing the read program unit or the part thereof; and means for displaying the bit stream data and the execution result.

According to another aspect of the present invention, there is provided a data display apparatus comprising: means for determining a program unit to be used in association with bit stream data; means for determining instruction data for the program unit, which is to be embedded in the bit stream data in accordance with a timing for executing the program unit; and means for arranging the program unit and the instruction data in the bit stream data.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinbefore.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention in which:

FIGS. 3A and 3B are diagrams showing examples of a received bit stream;

FIGS. 14A and 14B are diagrams showing examples of a file recording format;

DETAILED DESCRIPTION OF THE INVENTION

Preferred embodiments of the present invention will now be described with reference to the accompanying drawings.

For easier understanding of the present invention, the fundamental concept will be described briefly prior to the detailed description of the individual embodiments.

The present invention provides a system which synchronizes display of bit stream data with execution of a program which is multiplexed on the bit stream data.

Let us consider a case where multimedia data consisting of a mixture of a moving-picture bit stream and a program is broadcast or is stored on a disk. A bit-stream data display apparatus extracts a program unit which has been superimposed on bit stream data in the form of a packet or the like, and retains it as an executable program unit. Execution of the executable program unit is carried out in accordance with an instruction embedded in bit stream data which is input after the extraction of the program unit.

The present invention can ensure smooth synchronization of reproduction of a bit stream with execution of a program. Instructions for a program unit may include an instruction for releasing an execution standby state of the program unit and an instruction for saving program unit codes on a data storage medium.

For instance, a program unit which has received an instruction to release the execution standby state liberate the resources of the bit-stream data display apparatus by, for example, erasing its own codes from the main memory. This can reduce consumption of the resources of the bit-stream data display apparatus. Further, saving the codes of a program unit on a data storage medium can temporarily release the resources of the bit-stream data display apparatus and can allow those codes to be used later whenever necessary.

As apparent from the above, the present invention can implement smooth synchronization of reproduction of a bit stream with execution of a program. Moreover, the present invention can ensure finer program-based control on the operation of the bit-stream data display apparatus.

First Embodiment

The first embodiment of the present invention will be discussed first.

Figure 1:
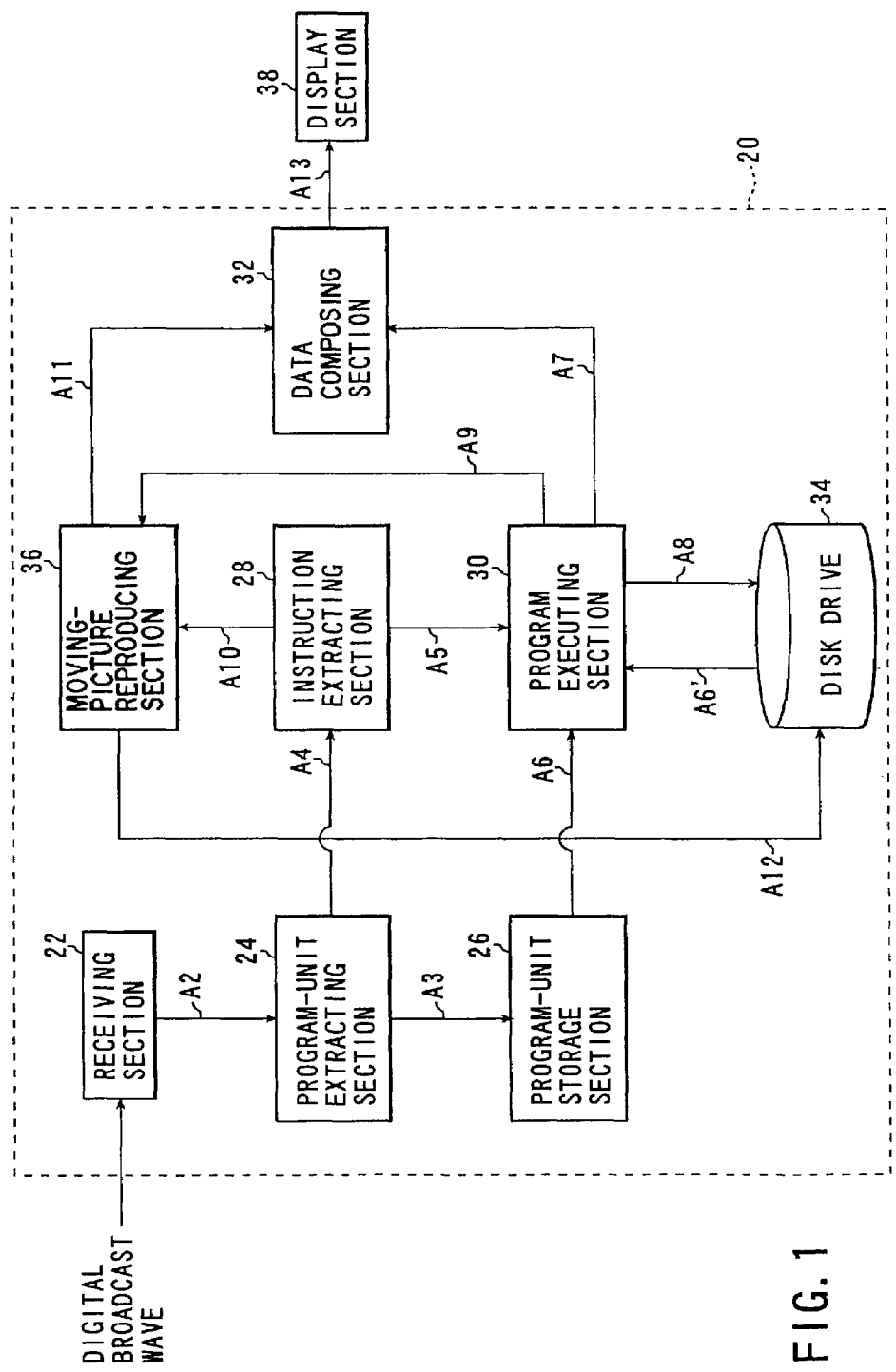
FIG. 1 is a diagram exemplifying the constitution of a bit-stream data display apparatus according to a first embodiment of the present invention.

FIG. 1 depicts the constitution of a bit-stream data display apparatus according to this embodiment.

The following description of this embodiment will be given of a case where broadcast bit stream data is displayed as on, for example, a broadcast receiving apparatus.

As shown in FIG. 1, a bit-stream data display apparatus 20 according to this embodiment includes a receiving section 22, a program-unit extracting section 24, a program-unit storage section 26, an instruction extracting section 28, a program executing section 30, a data composing section 32 and a moving-picture reproducing section 36. Connected to the bit-stream data display apparatus 20 is a display section (display unit) 38. Note that a disk drive 34 shown in FIG. 1 is provided as needed.

The receiving section 22 receives digital broadcast waves, performs D/A conversion on the waves and transfers bit streams of a predetermined proper size to the program-unit extracting section 24. This extracting section 24 thus receives the bit streams the receiving section 22 has received, one after another.

The program-unit extracting section 24 extracts a program unit, transfers it to the program-unit storage section 26 and sequentially sends the instruction extracting section 28 a sequence of bits which does not belong to the program unit.

The program-unit storage section 26 stores a program unit.

The instruction extracting section 28 extracts an instruction for the program unit, sends the instruction to the program executing section 30, and sends the other sequences of bits to the moving-picture reproducing section 36 one by one.

In accordance with the instruction for the program unit, sent from the instruction extracting section 28, the program executing section 30 reads and executes the corresponding program unit.

The moving-picture reproducing section 36 reproduces the moving-picture bit stream, transferred via the instruction extracting section 28, by decoding the bit stream, for example. When a moving-picture bit stream has been encoded by the MPEG system, for example, the bit stream is decoded in procedures which correspond to the encoding procedures.

The data composing section 32 combines a moving picture output from the moving-picture reproducing section 36, with display data generated as the program executing section 30 executes the program unit, and outputs the resultant data. When the data composing section 32 receives no display data to be combined, it outputs the moving picture that has been output from the moving-picture reproducing section 36.

The display section 38 displays an input moving picture.

Note that the "program unit" described above is a unit of a program the program executing section 30 executes. Each program unit has a name (e.g., a unit identifier) which is arbitrarily determined for that program unit.

Each program unit includes at least one function (the operational description of the program unit), and each function is identified by a name (e.g., a function identifier). A bit sequence of each program unit is sent, sandwiched by bit sequences respectively indicating the beginning and end of the program unit.

There are various kinds of functions which include one for performing control related to display of bit stream data, one for performing control related to recording of bit stream data, one associated with handing a program unit, and one for performing control related to user interface.

An instruction for the program unit includes the name of the received program unit, the function of that program unit and an augmentation for the function. The augmentation may be empty.

Figure 2:
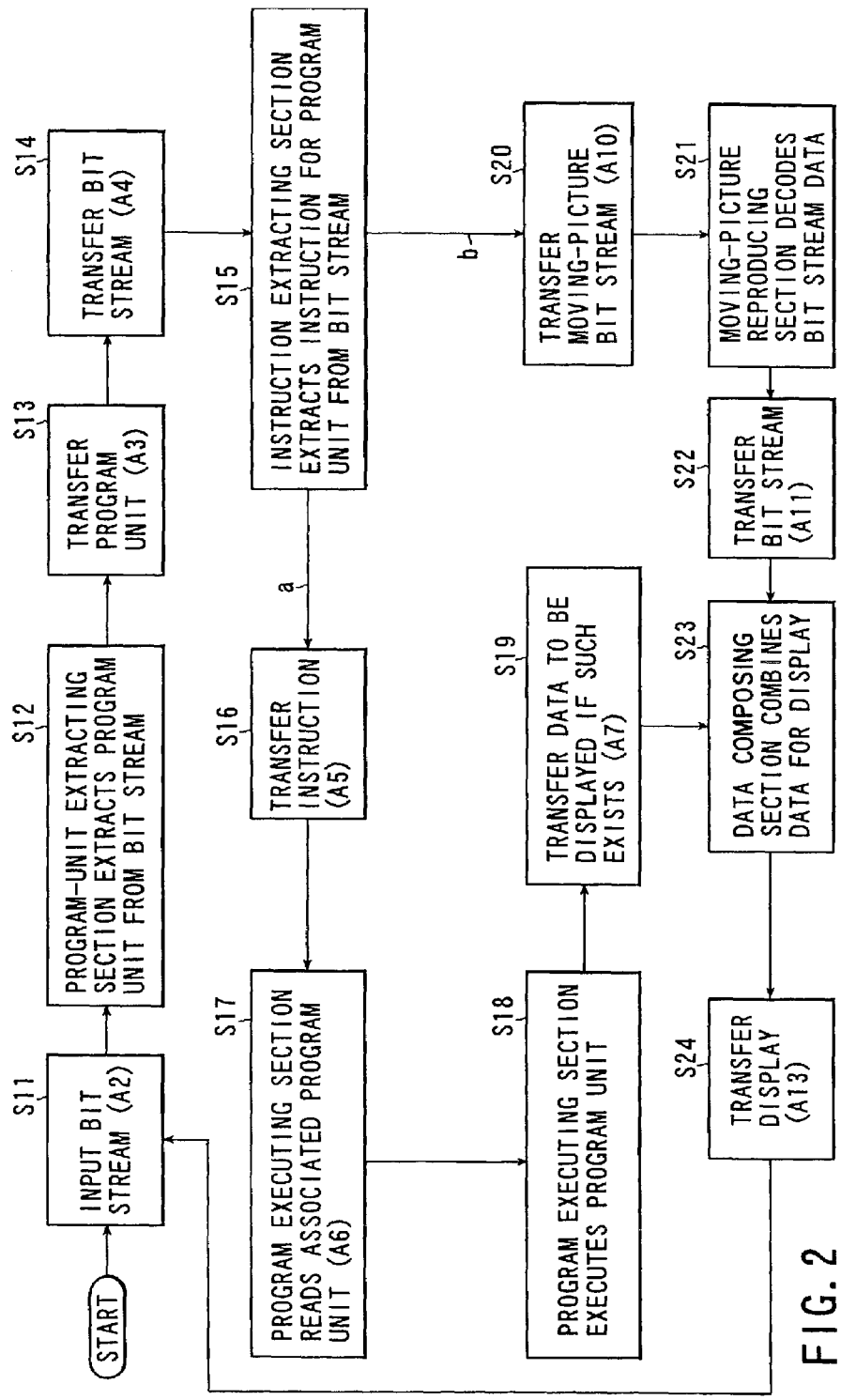
FIG. 2 is a flowchart illustrating the basic operation of the bit-stream data display apparatus in FIG. 1.

FIG. 2 illustrates the basic operation of the bit-stream data display apparatus according to this embodiment.

When the receiving section 22 receives a digital broadcast wave and a bit stream is input to the program-unit extracting section (step S11), the program-unit extracting section 24 extracts a program unit from the bit stream (step S12) and transfers the program unit to the program-unit storage section 26 (step S13). The program-unit extracting section 24 also transfers bit sequences which do not belong to the program unit to the instruction extracting section 28 one after another (step S14).

While an instruction for the program unit is not extracted from the bit stream by the instruction extracting section 28, the bit stream is transferred to the moving-picture reproducing section 36 (step S20), is reproduced by the reproducing section 36 (step S22) and is transferred via the data composing section 32 (step S23) to the display section 38 (step S24) to be displayed on the display screen.

When the instruction extracting section 28 extracts an instruction for the program unit (step S15), on the other hand, the subsequent control is separated into two flows a and b, which are carried out in parallel. While the flow b is associated with reproduction of the moving-picture bit stream, the flow a is associated with execution of a function of the program unit based on the instruction as will be discussed later. Note that when image data to be displayed is generated by executing the function of the program unit, the image data will be combined with the moving-picture bit stream by the data composing section 32 and thereafter the resultant data will be displayed on the screen.

Upon reception of the instruction for the program unit (step S16), the program executing section 30 reads codes of the corresponding program unit from the program-unit storage section 26 (step S17) and executes the function that is designated by the given augmentation (step S18).

There is a case where as a program unit is executed, it becomes necessary to display an image or text on the screen. In this case, display data is sent to the data composing section 32 (step S19). For example, the program executing section 30 sends the data composing section 32 a text and the display position for that text.

The display data sent to the data composing section 32 is combined with a moving-picture output from the moving-picture reproducing section 36 (step S23). That is, the data composing section 32 combines data in such a way that the text is overlaid on the screen at the designated display position.

There may be a case where a program unit includes a moving-picture bit stream in its data region. In this case, the moving-picture reproducing section intervenes (or is provided) between the program executing section 30 and the data composing section 32. This moving-picture reproducing section converts a moving-picture bit stream, sent from the program executing section 30, to displayable moving pictures, which are in turn sent to the data composing section 32.

The output of the data composing section 32 is transferred to the display section 38 (step S24) to be displayed on the screen.

The above-described sequence of steps is not restrictive, but may be partially modified. For instance, the order of steps S13 and S14 may be reversed or both steps may be executed in parallel.

FIGS. 3A and 3B exemplify the structure of data (which is sent to the program-unit extracting section 24 from the receiving section 22) that is acquired from a digital broadcast wave broadcast from a broadcasting station. Each diagram shows plural pieces of data in the same time band, which means that those data are multiplexed in a time-divisional manner. FIG. 3A shows a case where the band of bit stream data (moving-picture stream) is variable, and FIG. 3B shows a case where the band of bit stream data (moving-picture stream) is constant. Numeral 100 in the diagrams represent an instruction for a program unit.

Figure 4:
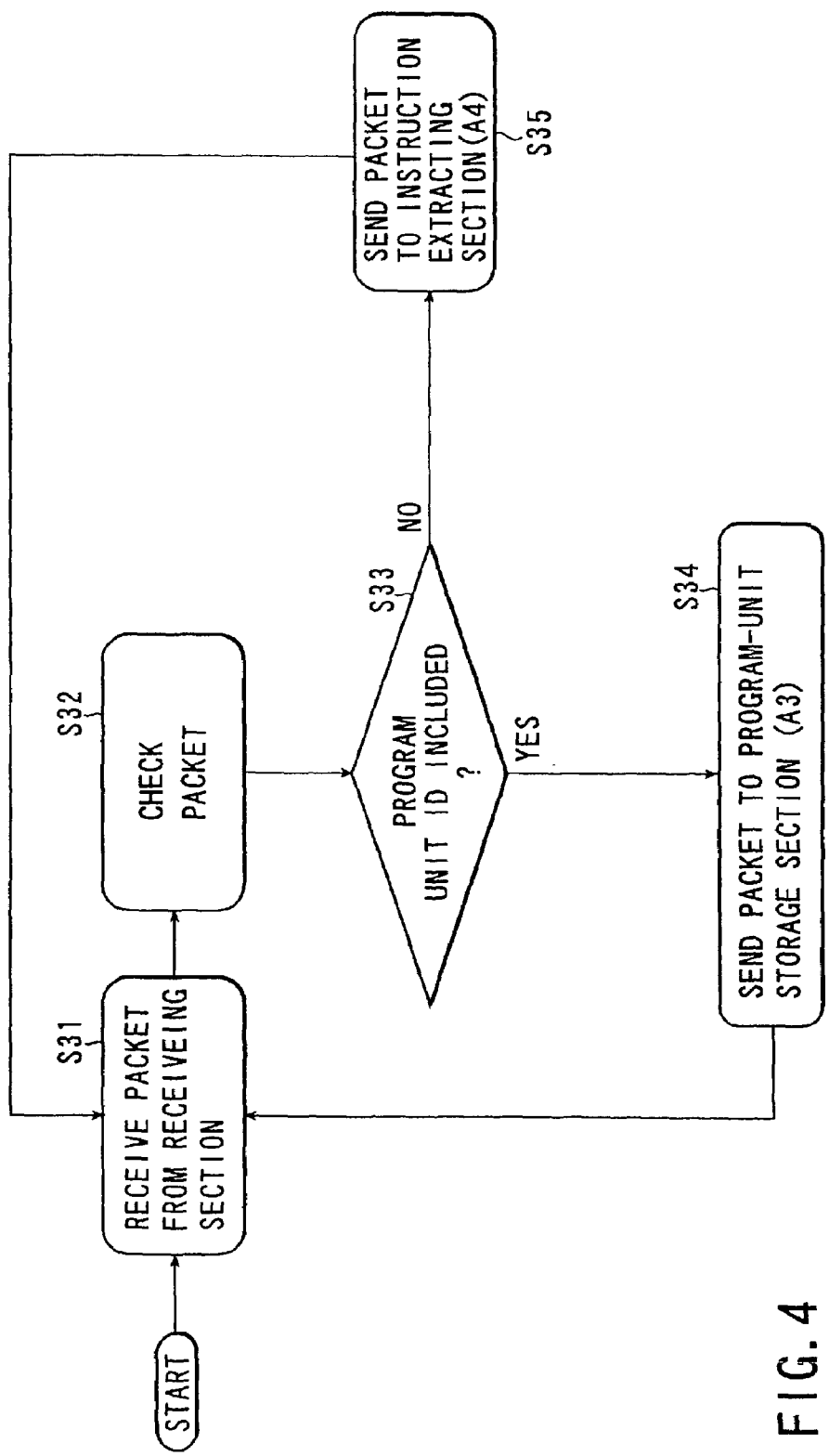
FIG. 4 is a flowchart showing one example of the operation of a program-unit extracting section shown in FIG. 1.

FIG. 4 shows one example of the operation of the program-unit extracting section 24.

A bit stream to be sent to the program-unit extracting section 24 from the receiving section 22 is separated to small packets each including one and only one of the following three kinds of bit sequences.

(1) A program unit ID and a part of the codes of the program unit.

(2) An instruction for the program unit.

(3) A flag indicating that a packet is moving-picture data and part of the moving-picture data.

The program-unit extracting section 24 checks the received bit stream (steps S31 and S32) to detect the bit sequences indicating the beginning and end of the program unit, thereby extracting codes and data of the program unit, and transfers those codes and data to the program-unit storage section 26 (steps S33 and S34). The program-unit extracting section 24 transfers only the bit sequences which do not belong to the program unit to the instruction extracting section 28 one after another (steps S33 and S35).

Figure 5:
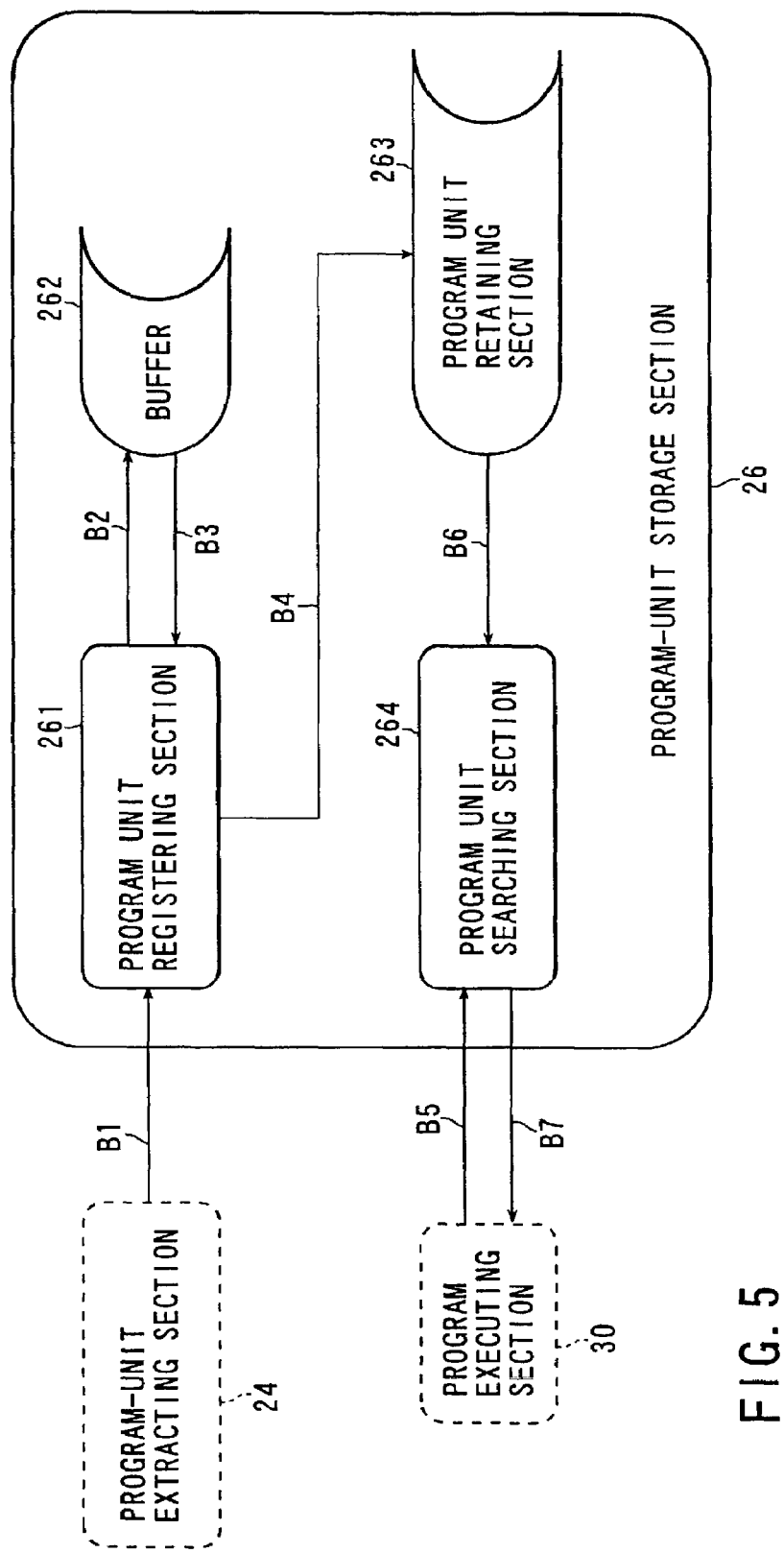
FIG. 5 is a diagram exemplifying the constitution of a program-unit storage section shown in FIG. 1.
Figure 6:
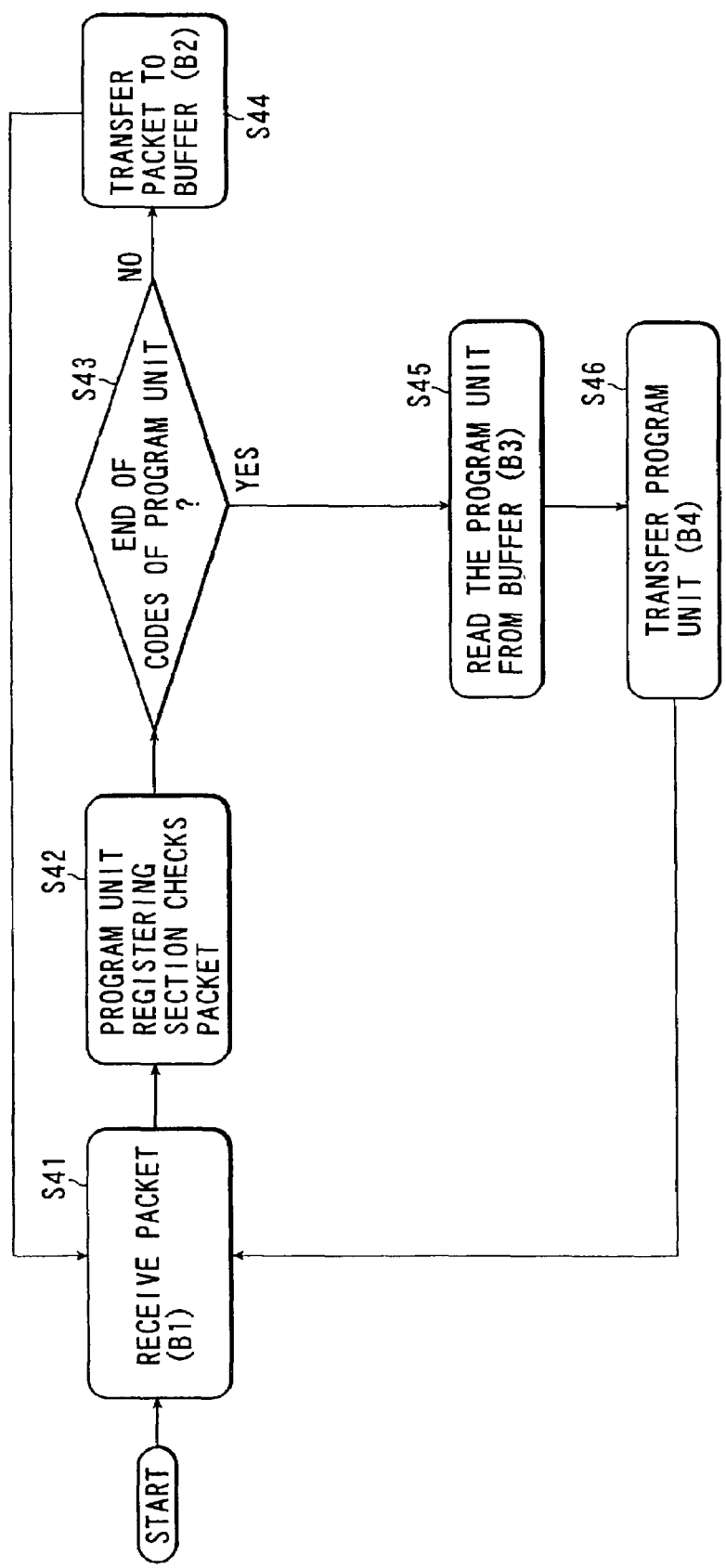
FIG. 6 is a flowchart showing one example of the operation of the program-unit storage section shown in FIG. 1.

FIG. 5 exemplifies the constitution of the program-unit storage section 26. FIG. 6 illustrates one example of the operation of the program-unit storage section 26 for storing a program unit.

In this constitution, the program-unit storage section 26 has a program unit registering section 261, a buffer 262, a program unit retaining section 263 and a program unit searching section 264.

In the program-unit storage section 26, the program unit registering section 261 classifies the received packets according to the program unit ID's (steps S41 and S42), and stores the packets in the buffer 262 in the order received (steps S43 and S44). There is a packet which includes both a program unit ID and a symbol indicative of the end of codes of the program unit. Upon reception of a packet which includes this symbol (step S43), the program unit registering section 261 of the program-unit storage section 26 reads this program unit from the buffer 262 (step S45) and transfers it to the program unit retaining section 263 (step S46) to be held as a usable program unit.

There may be a case where program units having the same name are repeatedly transferred. In this case, the program unit retaining section 263 of the program-unit storage section 26 discards a new program unit having the same name or overwrites the previously retained program unit with the new program unit. Alternatively, the program unit retaining section 263 may disregard the new program unit having the same name. The program units held in the program-unit storage section 26 are therefore determined specifically with respect to names.

Figure 7:
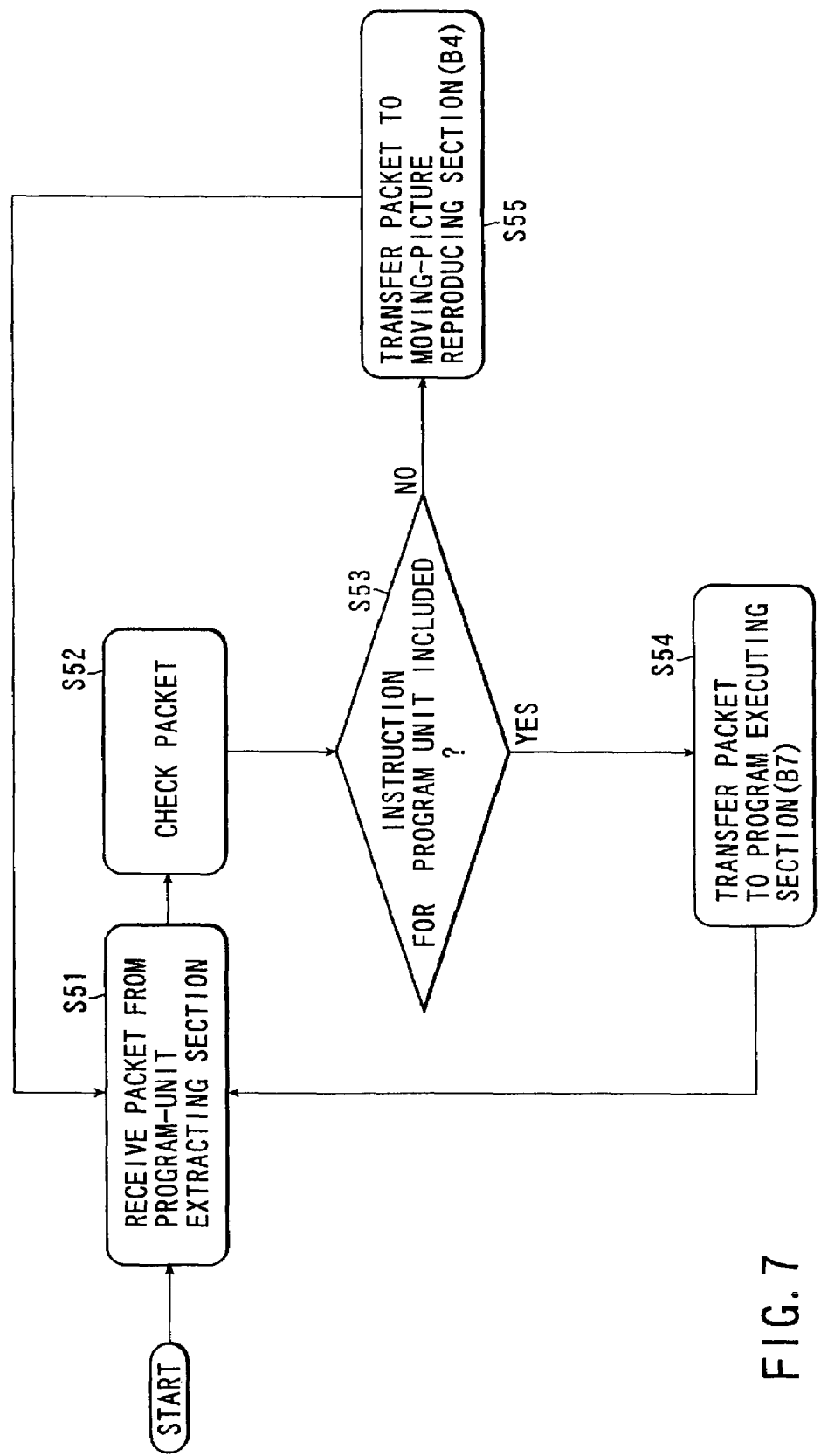
FIG. 7 is a flowchart exemplifying the operation of an instruction extracting section shown in FIG. 1.

FIG. 7 exemplifies the operation of the instruction extracting section 28.

The instruction extracting section 28 checks the received bit stream (steps S51 and S52), and transfers an instruction for the program unit, if such is included in the bit stream (step S53), to the program executing section 30 (step S54). The instruction extracting section 28 sequentially transfers the other sequences of bits to the moving-picture reproducing section 36 (steps S53 and S55).

Figure 8:
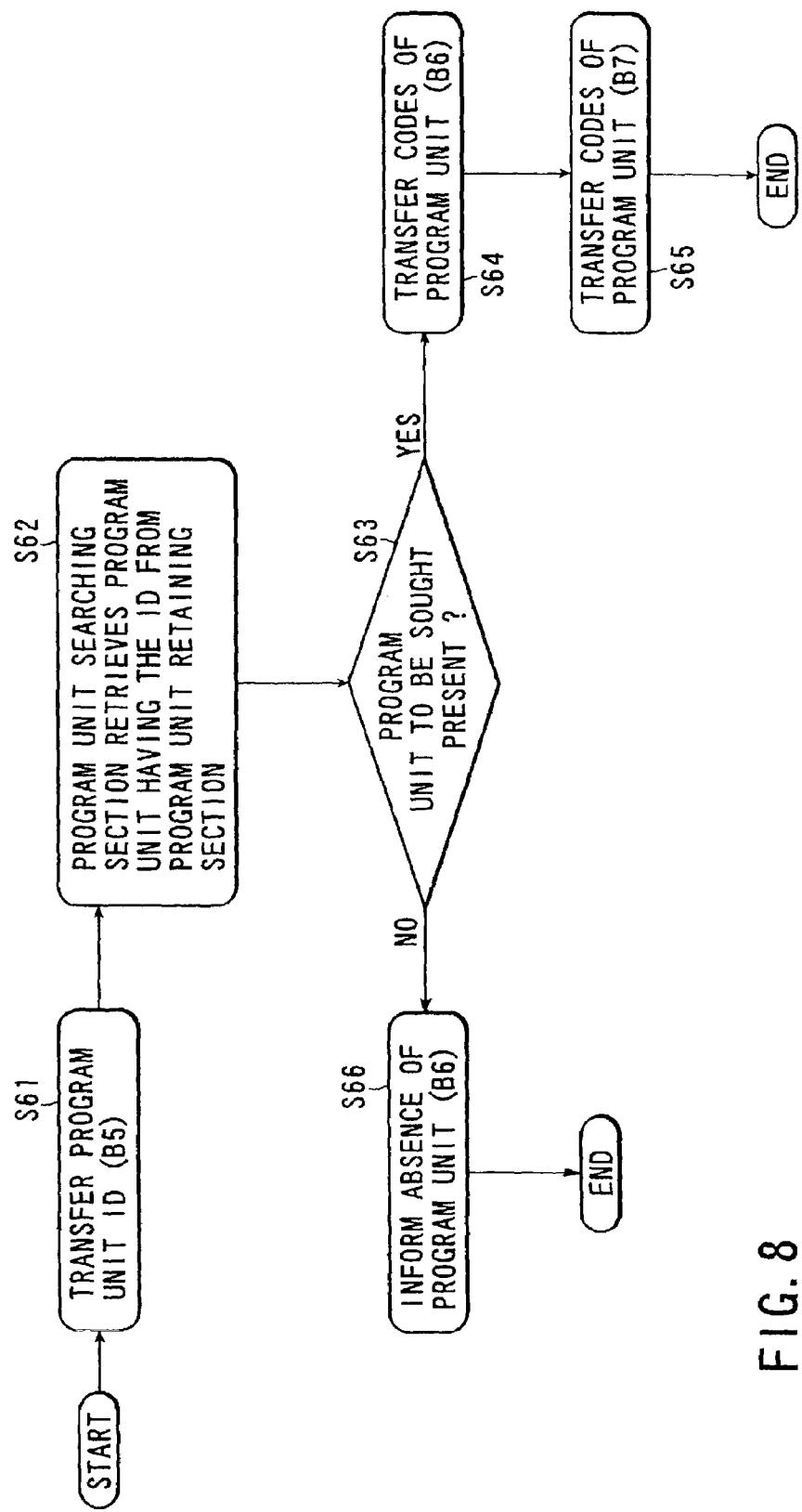
FIG. 8 is a flowchart exemplifying another operation of the program-unit storage section shown in FIG. 1.

FIG. 8 exemplifies the operation of the program-unit storage section 26 which is carried out when the program executing section 30 request the program-unit storage section 26 the readout of a program unit therefrom.

In FIG. 8, the program executing section 30 transfers a program unit ID to the program-unit storage section 26 to request reading of the program unit (step S61).

The program-unit storage section 26, which has received the request, searches the program unit retaining section 263 for the program unit that has the sent ID (step S62). When the corresponding program unit exists (step S63), codes of this program unit are transferred to the program unit searching section 264 from the program unit retaining section 263 (step S64) and are then sent to the program executing section 30 from there. When there is no corresponding program unit (step S63), on the other hand, the program executing section 30 is informed of the absence of the program unit (step S66).

When there is no corresponding program unit and the program executing section 30 is informed of the absence of the program unit, the program executing section 30 does not execute the instruction associated with the program unit. That is the program executing section 30 carries out a process as if the instruction did not exist in this case.

For example, there may be a case where when reception of bit stream data has started from halfway (e.g., when a user started watching a program halfway), transmission of the corresponding program unit has already been completed then. In such a case, the aforementioned process can prevent the system from going to an abnormal state en route.

In consideration of the above case, it is effective to transmit the same program unit several times.

The above-described constitution and operations of the individual components can implement synchronization of reproduction of moving pictures with execution of a program unit.

Since an instruction for a program unit indicates the execution of a function, the program executing section 30 can perform various operations.

As one example, an instruction for a program unit may be an instruction to cancel that program unit. In this case, the program executing section 30 sends a program unit ID and a cancel command to the program-unit storage section 26. The program unit searching section 264 in the program-unit storage section 26 searches the program unit retaining section 263 and deletes the codes of the program unit that has the ID. This task can erase a used program unit to save the resources of (the program unit retaining section 263 of) the program-unit storage section 26.

Erasing a program unit should not necessarily be implemented just by executing an erasure function. Alternatively, a program unit may have its own lifetime. Such a program unit is executed as a thread (a program unit to be executed in parallel) or a task (a program unit to be executed regularly) in the program executing section 30. The program unit checks the time every given time and terminates the process when the time passes a predetermined date, thereby releasing its own resources to the system.

Another instruction for a program unit may instruct to save codes of that program unit. In this case, the program executing section 30 reads the codes of the program unit from the program-unit storage section 26 and executes a function to save the program unit. The save function stores the codes of the program unit on the disk drive 34 (see A8 in FIG. 1).

Reading the codes of the program unit from the disk drive 34 is carried out in conformity to readout from the program-unit storage section 26. Specifically, when receiving an instruction for a program unit from the instruction extracting section 28, the program executing section 30 tries to acquire the codes of the program unit, specified by the instruction, from the program-unit storage section 26. When this program unit has already been erased from the program-unit storage section 26, the program-unit storage section 26 informs the program executing section 30 that the program unit is not found. In this case, the program executing section 30 searches the disk drive 34 for the codes of that program unit and reads the codes (see A6' in FIG. 1).

As another example, an instruction for a program unit may instruct to operate the individual components of this bit-stream data display apparatus 20.

One example of such an instruction is to save bit stream data on the disk drive 34. It is assumed that the program-unit storage section 26 retains codes of a program unit for controlling the moving-picture reproducing section 36 as one of resident program units. It is further assumed that this program unit has a function to start saving bit stream data on the disk drive 34.

When a packet in a bit stream includes a call for the function, the program executing section 30 reads the program unit from the program-unit storage section 26 and executes the save starting function as mentioned earlier. As a result, the program executing section 30 sends the moving-picture reproducing section 36 an instruction to start saving a bit stream data (see A9 in FIG. 1). Upon reception of this instruction, the moving-picture reproducing section 36 writes the input bit streams on the disk drive 34 one after another (see A12 in FIG. 1).

An operation at the time of aborting this writing is similarly performed.

This method can manipulate the recording function of a reception terminal using digital broadcast waves.

The following will discuss an example where a display apparatus for a digital storage medium (like a DVD) is controlled based on bit stream data included in that medium.

It is assumed that the program-unit storage section 26 retains a program for controlling the display apparatus as one of resident program units. It is also assumed that the control program has a function for skipping a data block as well as a skip invalidating function and a skip validating function. It is further assumed that a bit stream stored on a medium includes a data block in which data (advertisement, notice on a copyright, etc.) one expects users to surely hear and watch is recorded.

Figure 9:
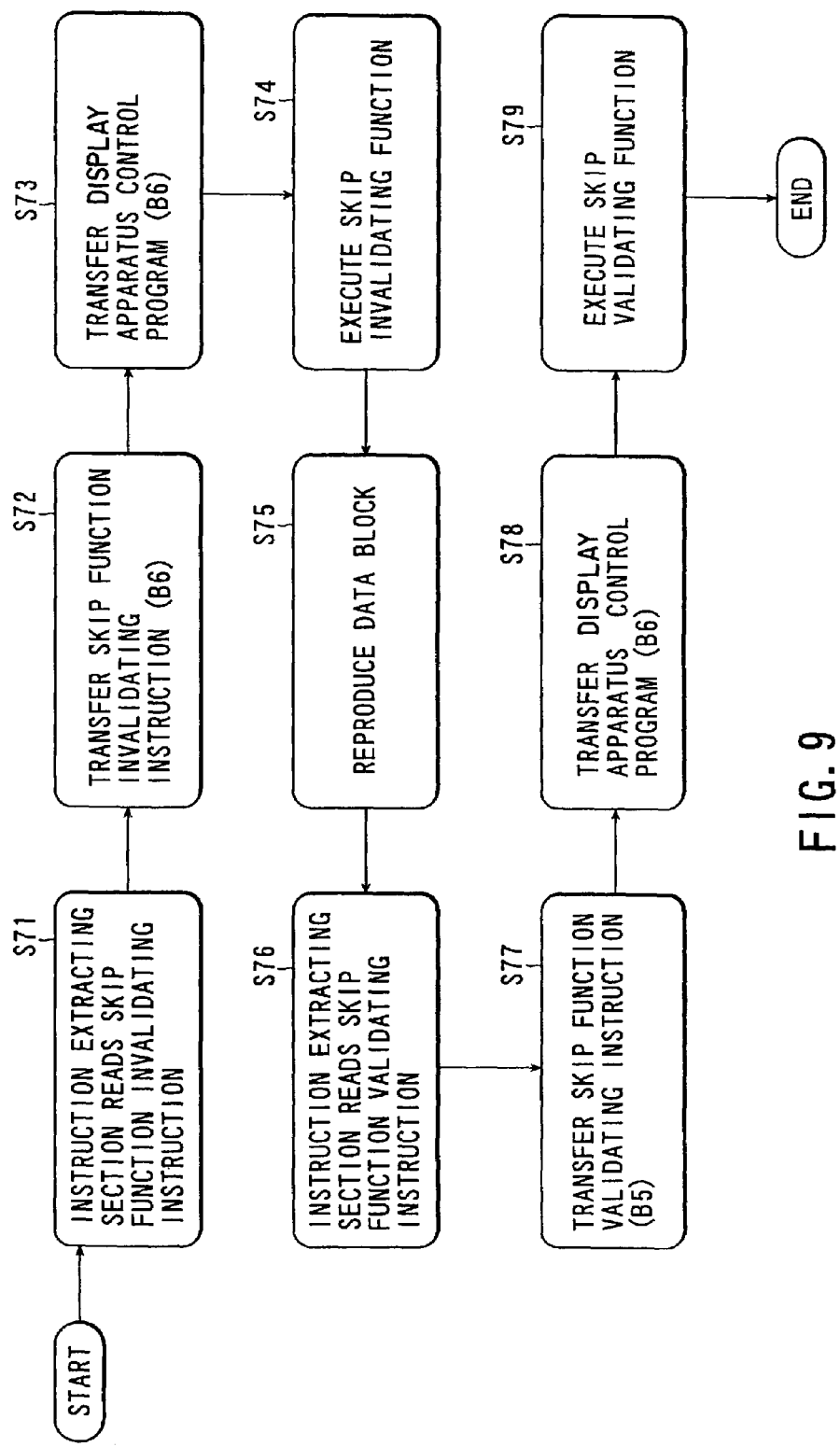
FIG. 9 is a flowchart exemplifying a skip inhibiting operation which is invoked by a function call of a program unit.

FIG. 9 exemplifies the operation of the display apparatus in such a case.

When an instruction to call a skip invalidating function for a control program is included prior to the data block, this instruction is transferred to the program executing section 30 from the instruction extracting section 28 (steps S71 and S72), and the program executing section 30 reads the control program from the program-unit storage section 26 (step S73) and executes the skip invalidating function (step S74). After the data block is reproduced (step S75), skipping becomes valid again by a skip-validating-function call instruction recorded directly after the data block (steps S76 to S79).

In this manner, data one wants users to surely hear and watch can be reproduced without being skipped by the users' manipulation.

Although digital broadcast waves are received in this embodiment, the present invention is also adaptable to a case where data is received through cable broadcasting and a case where data is read from a storage medium.

Although the display section (display unit) 38 is connected outside the bit-stream data display apparatus in this embodiment, the bit-stream data display apparatus may be designed to include the display section 38.

Second Embodiment

The second embodiment of the present invention will now be discussed.

In the first embodiment, the program executing section 30 acquires codes of a program unit from a bit stream (i.e., from the program-unit storage section 26) or from the disk drive 34. In contrast to this, the second embodiment is so designed as to be able to acquire codes of a program unit over a network.

Figure 10:
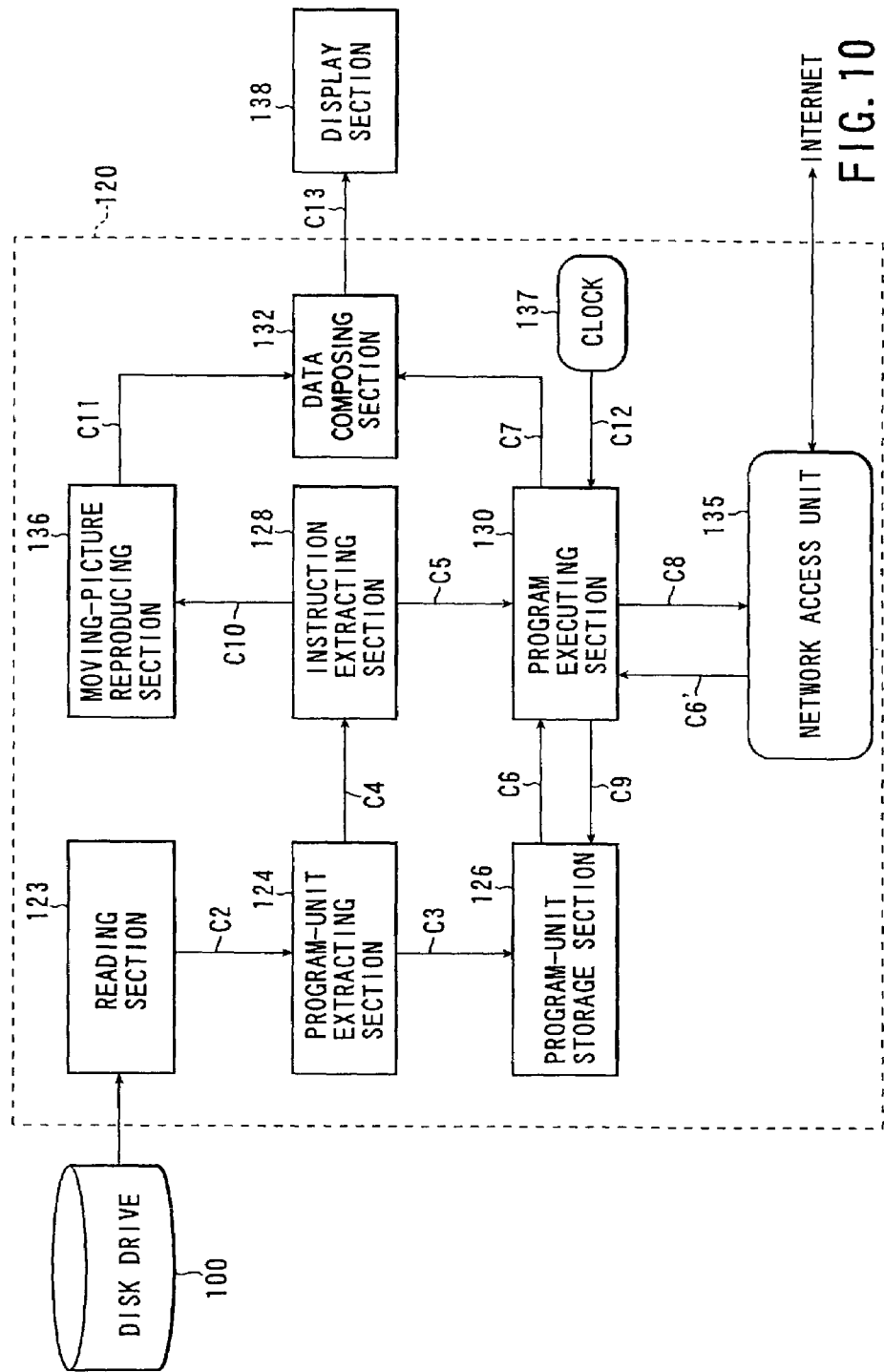
FIG. 10 is a diagram exemplifying the constitution of a bit-stream data display apparatus according to a second embodiment of the present invention.

FIG. 10 depicts the constitution of a bit-stream data display apparatus according to this embodiment. Although the foregoing description of the first embodiment mainly covers a case of receiving digital broadcast waves are, the following description of this embodiment will be given of a case where data is read from a storage medium, such as a DVD, on which data is recorded by a disk player.

As shown in FIG. 10, a bit-stream data display apparatus 120 according to this embodiment includes a reading section 123, a program-unit extracting section 124, a program-unit storage section 126, an instruction extracting section 128, a program executing section 130, a data composing section 132, a network access unit 135, a moving-picture reproducing section 136 and a clock 137. Connected to the bit-stream data display apparatus 120 is a display section 138.

The bit-stream data display apparatus 120 of this embodiment is so designed as to be able to acquire codes of a program unit over an Internet, and its basic constitution excluding the network access unit 135 and the clock 137 is the same as that of the apparatus shown in FIG. 1. That is, the program-unit extracting section 124, the program-unit storage section 126, the instruction extracting section 128, the program executing section 130, the data composing section 132, the moving-picture reproducing section 136 and the display section 138 of this embodiment respectively have corresponding components of the program-unit extracting section 24, the program-unit storage section 26, the instruction extracting section 28, the program executing section 30, the data composing section 32, the moving-picture reproducing section 36 and the display section 38 of the first embodiment. Further, the operation of the bit-stream-data display apparatus of this embodiment is basically similar to that of the first embodiment as illustrated in FIG. 2.

Although this embodiment has the reading section 123 for reading data from a disk drive 100 instead of the receiving section 22 of the first embodiment, data to be given to the program-unit extracting section 124 is similar to data supplied to the program-unit extracting section 24 of the first embodiment.

The following description mainly discusses the differences from the first embodiment.

It is assumed that a program unit A read from bit stream data is stored in the program-unit storage section 126. It is also assumed that the program unit A holds part of advertisement data so that when a function to display the program unit A is executed, the date is acquired from the clock 137 and a text which varies depending on whether the time is A.M. or P.M. is displayed in the advertisement. It is assumed that the program unit A retains valid period data for the program unit A. It is also assumed that the program unit A holds data which becomes necessary at the time of updating the program unit A when the valid period expires. That is, the program unit A holds the name (or address data) or the like of a server which provides a new version of the program unit A.

It is further assumed that a program unit for implementing network access is always resident in the program-unit storage section 126.

Figure 11:
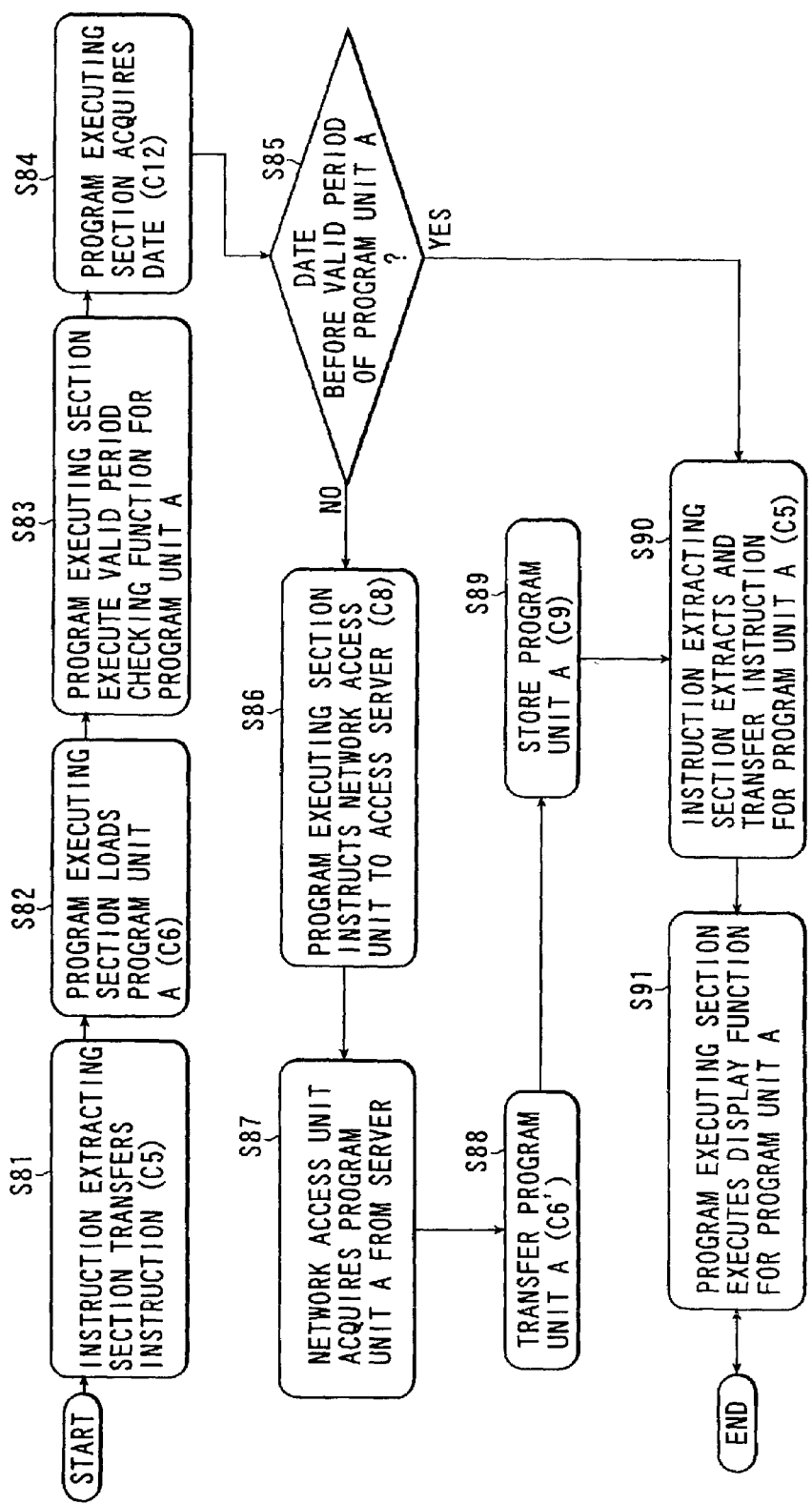
FIG. 11 is a flowchart illustrating the basic operation of the bit-stream data display apparatus in FIG. 10.

FIG. 11 illustrates one example of the operation of the bit-stream data display apparatus of this embodiment for updating advertisement data over an Internet. FIG. 11 shows an operation which takes place after the program-unit storage section 128 sends the program executing section 130 a call instruction for a function to display the program unit A. In consideration of the time needed for access to the network, confirmation of the valid period of the program unit A should be performed in good time before the display function for the program unit A is called.

When the instruction extracting section 128 extracts a call instruction for the display function for the program unit A from a bit stream, this instruction is transferred to the program executing section 130 (step S81).

The program executing section 130 loads the program unit A (step S82), executes a function to check the valid period of the program unit A (step S83) and acquires the date from the clock 137 (step S84).

When the date is past the valid period of the program unit A (step S85), the program executing section 130 instructs the network access unit 135 to access a predetermined server (step S86). In response to this instruction, the network access unit 135 acquires the program unit A from the specified server (step S87) and sends it to the program executing section 130 (step S88). Further, the program unit A is transferred from the program executing section 130 to the program-unit storage section 126 to be stored there (step S89). When the date has not passed the valid period of the program unit A yet, it is unnecessary to carry out the updation of the program unit A.

Then, the instruction extracting section 128 extracts a call instruction for the display function for the program unit A from a bit stream and transfers the instruction to the program executing section 130 (step S90), after which the program executing section 130 loads the program unit A from the program-unit storage section 126 and executes the display function for the program unit A (step S91).

Although data is read from a storage medium in this embodiment, the present invention can also be adapted to a case where data is received through radio broadcasting or cable broadcasting.

Although the display section (display unit) 138 is connected outside the bit-stream data display apparatus in this embodiment, the bit-stream data display apparatus may be designed to include the display section 138.

Third Embodiment

The third embodiment of the present invention will now be discussed.

The description of this embodiment will discuss a bit-stream data generating apparatus that generates and edits bit stream data which is displayed by the bit-stream data display apparatus of the first or second embodiment.

Figure 12:
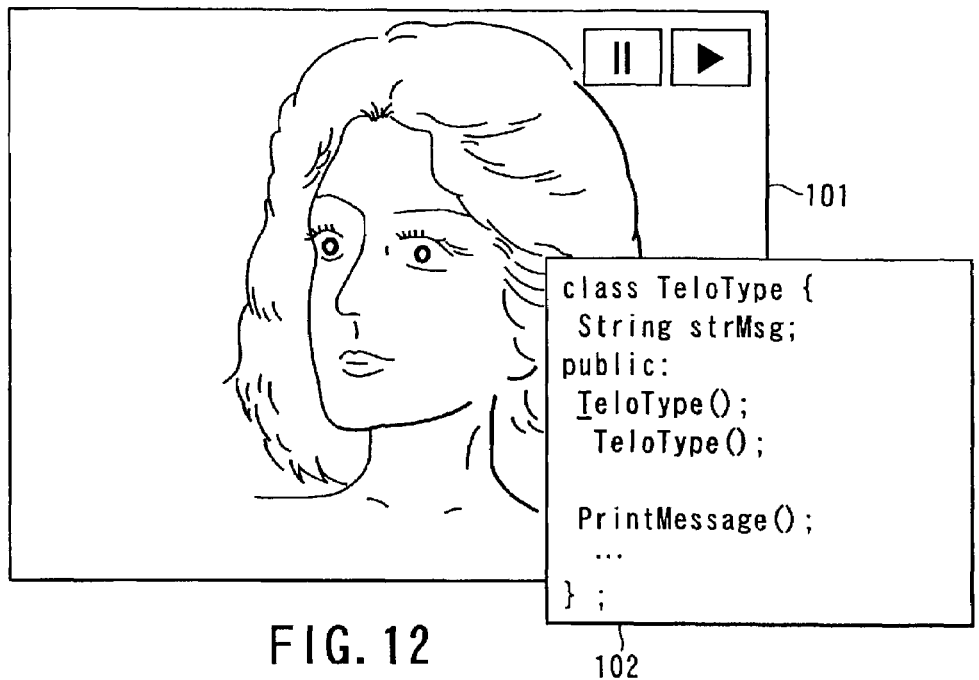
FIG. 12 is a diagram for explaining one example of a moving-picture bit stream data generating/editing screen.

FIG. 12 exemplifies a bit stream data generating/editing screen. In this example, edition for adding an event such as displaying a message to a viewer in a specific frame of a moving-picture stream is performed. An editor reproduces moving pictures and pauses the reproduction in a frame 101 at which an event starts. The screen shown front in FIG. 12 is a program generating screen 120. The editor describes a to-be-generated event on the program generating screen 120.

Figure 13:
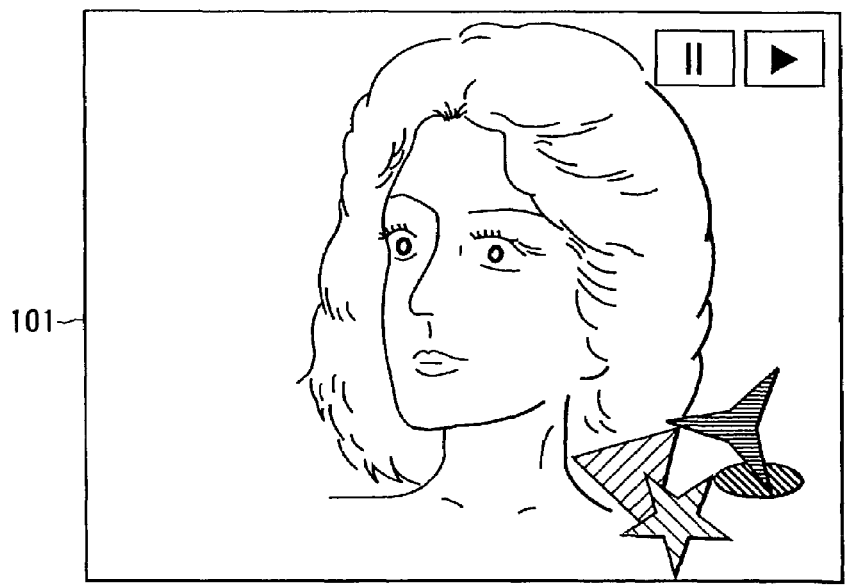
FIG. 13 is a diagram for explaining one example of the result of generation/edition of moving-picture bit stream data.

Although the illustrated example directly generates a program unit, a more visual editing work is possible. For example, a CG moving picture has previously been prepared by a separate tool. In this case, one possible interface is to pause reproduction in an event generated frame (i.e., a CG moving picture reproduction start frame) 101 as in the previous case, and to drag and drop a file holding the CG moving picture on the edition screen, so that the initial state of the CG moving picture is displayed over the screen (the image at the lower right side in FIG. 13).

Data which has been generated and edited by the above-described operation is stored in a file. This file has a format as shown in FIGS. 14A and 14B, for example. FIG. 14A shows data in which an instruction for a program unit (a function call for the program unit) 300 is included in a moving-picture bit stream, and FIG. 14B shows data which consists of a program unit to be used. Another possible case is that each program unit or every plural program units are discretely inserted in the data in FIG. 14A.

The bit-stream data generating apparatus according to this embodiment converts intermediate data stored in the aforementioned file to the format as shown in FIG. 3A or 3B so that the data can be allocated to resources.

Figure 15:
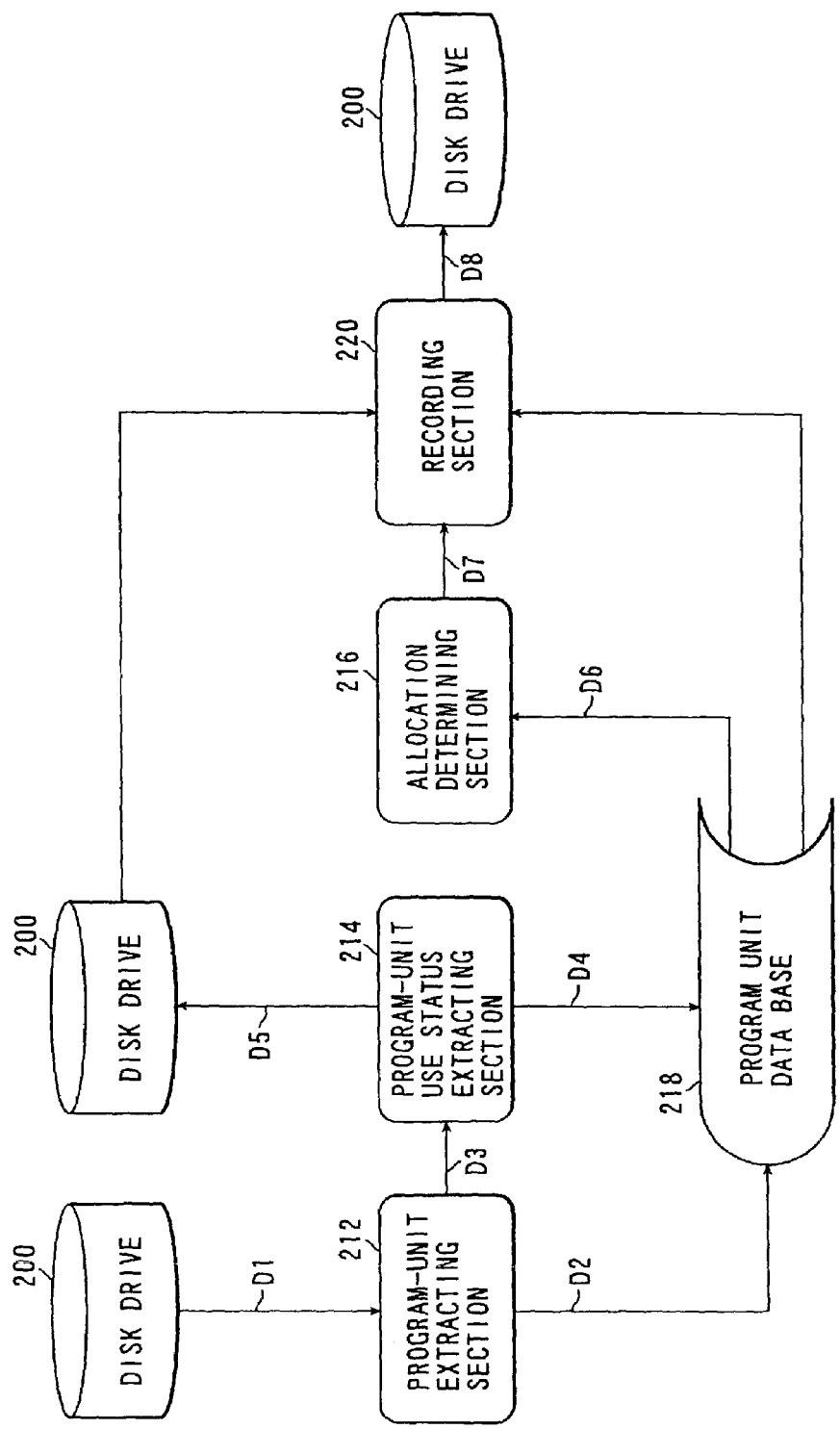
FIG. 15 is a diagram showing the constitution of a bit-stream data generating apparatus according to a third embodiment of the present invention.
Figure 16:
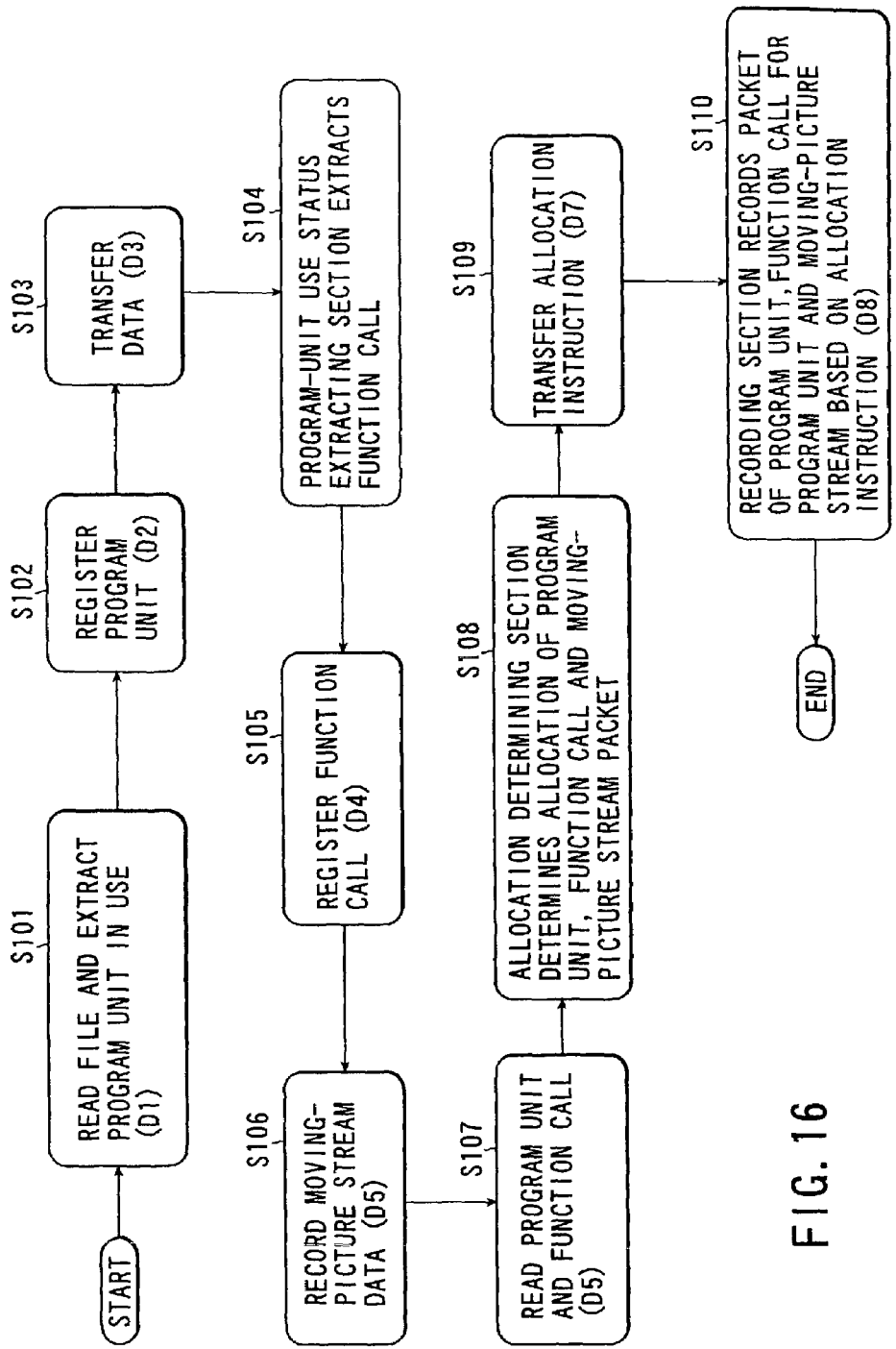
FIG. 16 is a flowchart illustrating the basic operation of the bit-stream data generating apparatus in FIG. 15.

FIG. 15 depicts the constitution of the bit-stream data generating apparatus according to this embodiment. FIG. 16 exemplifies the operation of the bit-stream data generating apparatus of this embodiment.

As shown in FIG. 15, this bit-stream data display apparatus has a program-unit extracting section 212, a program-unit use status extracting section 214, an allocation determining section 216, a program unit data base 218 and a recording section 220. A file as exemplified above is to be stored on a disk drive 200.

In the case of the format in which each program unit or every plural program units are discretely inserted in the data in FIG. 14A, the program-unit extracting section 212 extracts a program unit in use from the file on the disk drive 200 and registers it in the program unit data base 218 (steps S101 and S102). In the case of the format in which program units to be used are grouped as shown in FIG. 14B, the program-unit extracting section 212 extracts the group of program units from the file on the disk drive 200 and registers the group in the program unit data base 218 (step S102).

Data from which a program unit has been removed or data in FIG. 14A is transferred to the program-unit use status extracting section 214 at the subsequent stage (step S103). The program-unit use status extracting section 214 extracts a function call for the program unit (step S104) and registers its position on the bit stream data (e.g., the time from the head) in the program unit data base 218 (step S105).

Through the above operation, all the program units in use in the file and the position of each function call are recorded in the program unit data base 218.

The program-unit use status extracting section 214 records the remaining data (i.e., data of the moving-picture bit stream) on the disk drive 200 (step S106).

Then, the allocation determining section 216 determines the allocation of data by referring to the program unit data base (steps S107 and S108). In other words, the allocation determining section 216 determines how to separate a program unit and a function call to packets of a proper size and merge them in packets of a moving-picture bit stream.

An allocation determining algorithm will now be discussed.

Suppose the band width is 1000 and a maximum of 1000 packets can be transmitted per unit time (the packet size being assumed to be constant). Further assume that moving-picture stream data has a fixed band width of 900. Let program units registered in the program unit data base have an arrangement of $\{Pj\}$ (where j ranges from 1 to n). Let $T(Pj)$ be the position the program unit Pj is called first, $t(Pj)$ be the last call position and $S(Pj)$ be the size of Pj (measured in packet units).

Figure 17:
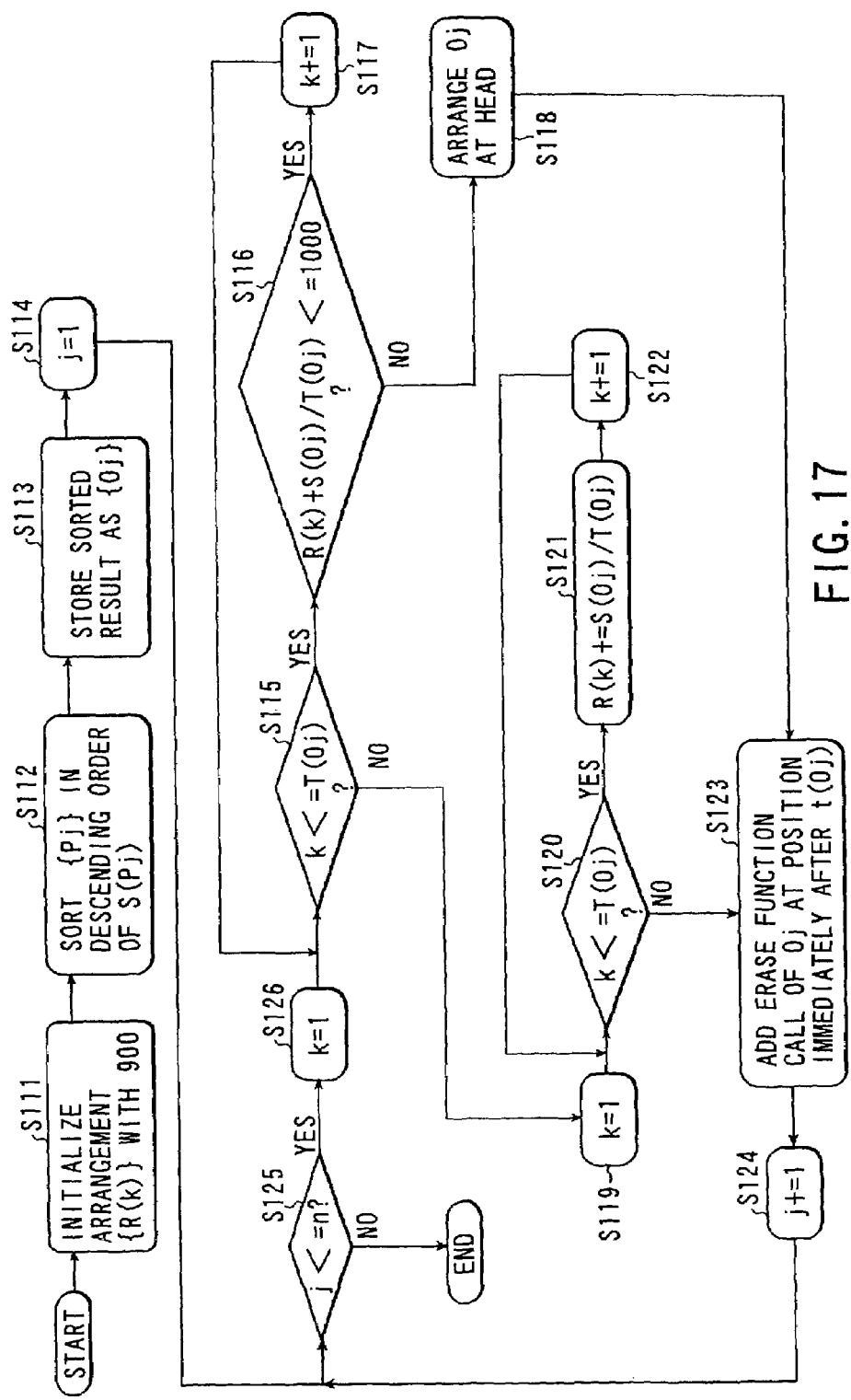
FIG. 17 is a flowchart illustrating one example of the operation of an allocation determining section shown in FIG. 15.

FIG. 17 exemplifies the operation of the allocation determining section 216.

The allocation determining section 216 is holding program units of an arrangement $\{R(k)\}$ (where k is a positive integer ranging from 1 to Te). It is to be noted that Te is the end position of a moving-picture stream. The individual elements of the arrangement are initialized with the band width of 900 of the moving-picture stream.

The arrangement $\{R(k)\}$ is initialized with 900 in step S111, $\{Pj\}$ are sorted in the descending order of $S(Pj)$ in step S112, the sorting results are stored as $\{Oj\}$ in step S113, and j=1 is set in step S114.

When $j \leq n$ in step S125, the flow proceeds to step S126, whereas when $j \leq n$ is not met, the flow is terminated.

When the flow goes to step S126, k=1 is set after which if $k \leq T\{Oj\}$ in step S115, the flow moves to step S116, whereas if $k \leq T\{Oj\}$ is not met, the flow proceeds to step S119.

When the flow goes to step S116, if $R(k)+S(Oj)/T\{Oj\} \leq 1000$, the flow proceeds to step S117 to increment k by 1 after which the flow returns to step S115. If $R(k)+S(Oj)/T\{Oj\} \leq 1000$ is not met in step S116, the flow proceeds to step S118 to decide that Oj should be located at the head after which the flow returns to step S123.

When the decision in step S115 is NO and the flow then proceeds to step S119, k=1 is set after which if $k \leq T\{Oj\}$ in step S120, the flow goes to step S121 to increment $R(k)$ by $S(Oj)/T\{Oj\}$ and then k is incremented by 1 in step S122. After that, the flow returns to step S120.

If $k \leq T\{Oj\}$ in step S120, the flow proceeds to step S123.

When the flow proceeds to step S123 through step S118 as a result of the negative decision (NO) in step S116 or directly from step S120 as a result of the negative decision (NO) there, it is decided to add an erase function call of Oj at the position directly after t(Oj) and j is incremented by 1 in step S124 after which the flow returns to step S125.

Figure 18:
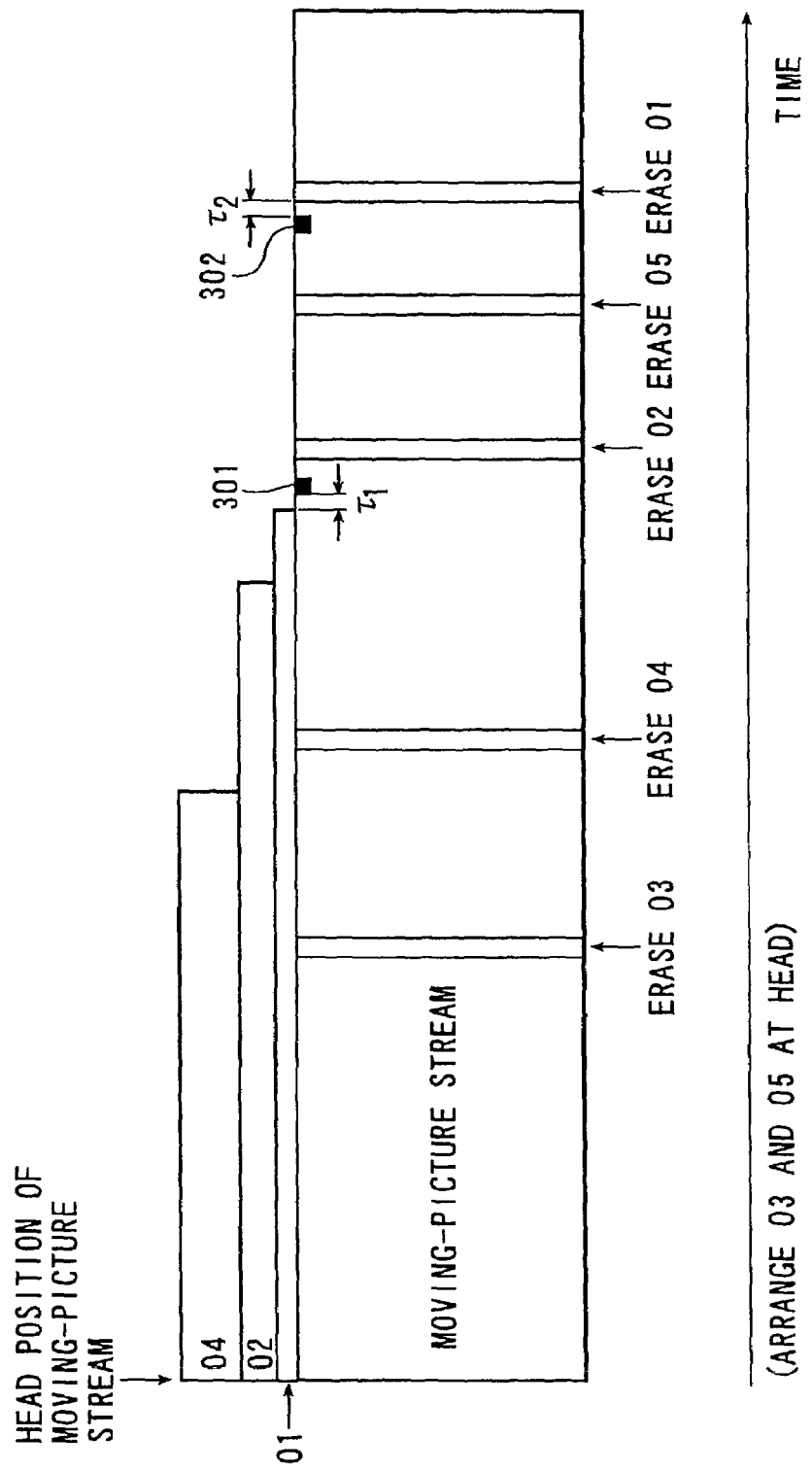
FIG. 18 is a diagram exemplifying the allocation that is determined by the operation in FIG. 16.

As the processes of steps S111 to S114 in FIG. 17 are executed and the loop process of steps S125, S126 and S115-S124 is executed until NO is resulted in step S125, the arrangement as shown in FIG. 18 is acquired.

Next, the arrangement of those program units which have been determined to be laid at the head (the program unit O3 and program unit O5 in FIG. 18) is determined. First, the time (measured in terms of unit times) for recording only packets of the program units is determined. This time is set sufficiently large. Then, the packets of the program units O3 and O5 are uniformly arranged at the head.

Figure 19:
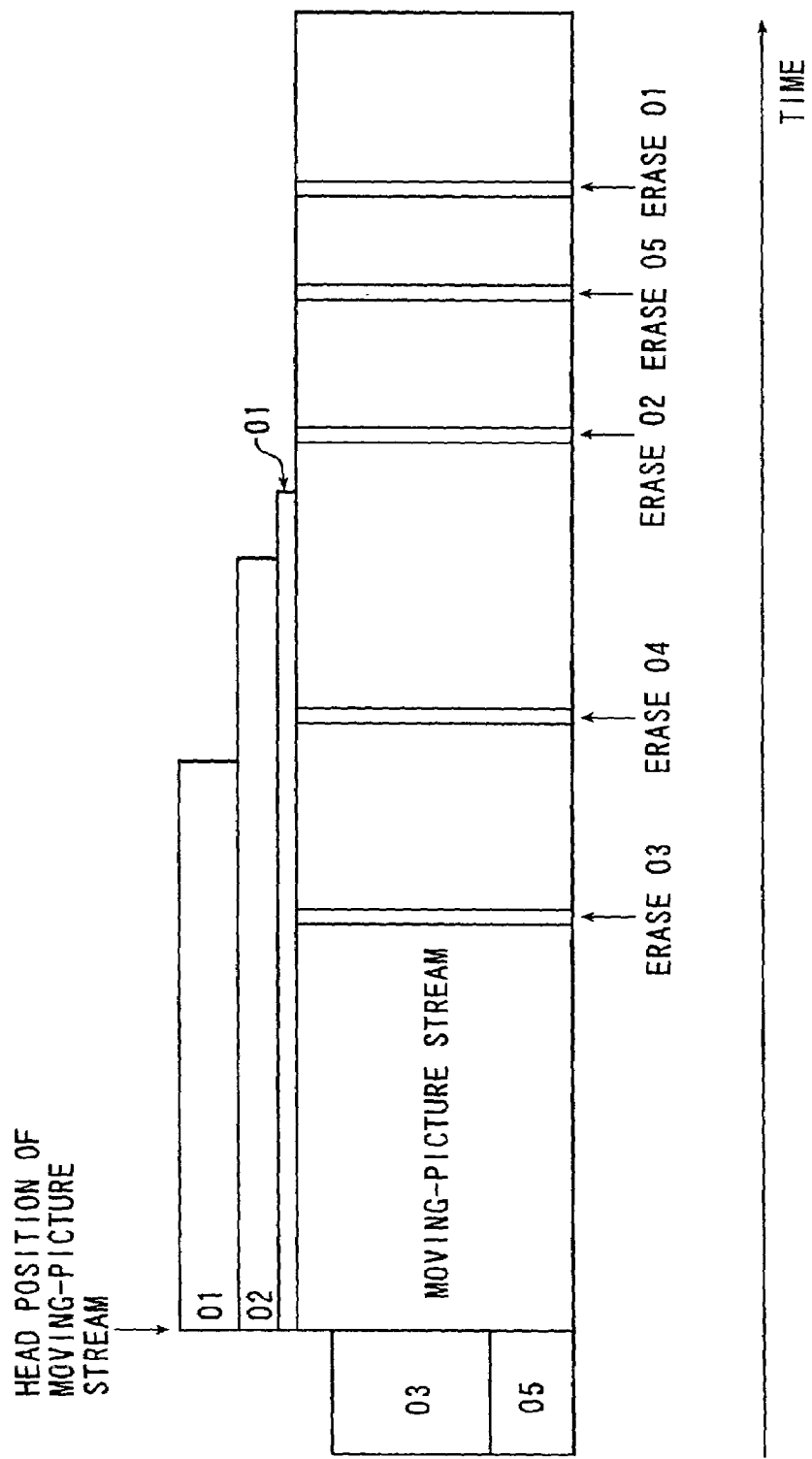
FIG. 19 is a diagram depicting one example of the allocation that is determined by the allocation determining section shown in FIG. 15.

FIG. 19 depicts the allocation that is determined by the allocation determining section 216.

Note that the above-described operation of the allocation determining section 216 is just an example, and allocation may be determined in such a way that program units, multiplexed on a moving-picture stream, are repeated recorded until the last call instruction for the function of an associated program unit is issued. This allocation is particularly effective when a recorded bit stream is distributed by such means as broadcasting. In the case of broadcasting, a listener/viewer does not necessarily listen to or watch a program from the first. The repetitive transmission of program units can allow a user who has missed the head of the program to acquire the necessary program units.

The allocation determining section 216 sends the instruction of the determined allocation to the recording section 220 (step S109).

The recording section 220 records program units, their call instructions and a moving-picture stream based on the instruction of the determined allocation (step S110). Specifically, packets of individual times are mixed in a moving-picture stream by ratios determined as shown in FIG. 19 and the resultant data is recorded on the disk drive 200.

It is desirable to determine the allocation in such a manner that transmission of any necessary program unit is completed before a position which comes earlier by a predetermined time $\tau 1$ than the first call position of that program unit (the position at which an instruction for the corresponding program unit has been multiplexed first) as exemplified in FIG. 18. In other words, it is desirable to determine the allocation in such a manner that a margin of more than the predetermined time $\tau 1$ is provided between the end position of a program unit and the first call position of that program unit. This allocation is proposed in consideration of a time lag from the point of fetching data of a program unit in the system to the point at which the program unit is actually executed.

This time lag varies depending on a plurality of factors, such as the operational speed of a CPU in the system and the data length of a program unit. The predetermined time $\tau 1$ can therefore be set by various schemes including one to previously set the time $\tau 1$ to a constant value and one to set the time $\tau 1$ every time from a predetermined equation or a table formed with only the data lengths of program units taken as a parameter.

There is no particular restriction on a time $\tau 2$ between the last call position of a program unit and the position of an erase function call which is inserted immediately after the former position.

The lifetime of a program unit may be thought to be equal to the range from the point past by $\tau 1$ from the end of the program unit to the point at which the program unit is called last. For example, an instruction for this program unit may be newly inserted within this range. Further, inserting the same program unit within this range may allow a user to obtain the program unit even when the user has missed the head of the associated bit stream.

The above-described functions can entirely or partially be implemented by software. Further, the above-described individual procedures or means can be implemented as machine-readable media on which programs to be run by a computer are recorded. Specifically, the procedures of operations described in each of the embodiments may be stored on a storage medium in the form of program code instructions, and may be read out therefrom and executed by a computer (processor), as needs.

According to the present invention, as described in detail, when data, which is acquired by multiplexing a program unit including at least one function and instruction data for the program unit (e.g., identification data of the program unit, a function to be executed, and data including a necessary augmentation or the like) on bit stream data, is received, the bit stream data is displayed, the program unit is extracted and held, and the function of the program unit is executed in accordance with extracted instruction data, so that reproduction of a bit stream can be smoothly synchronized with execution of a program. Since it is possible to give an instruction like saving of a program unit, reading the program unit or erasing the program unit, as an instruction for that program unit, the resources can be used efficiently. In addition, various operations can be finely controlled at the necessary timings.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

The invention claimed is:

1. A stream reproducing apparatus, comprising:
    a first extracting section configured to extract a program unit from bit stream data stored with the program unit to be used for carrying out a processing related to the bit stream data and instruction data for providing an instruction to the program unit, the program unit and the instruction data being multiplexed on the bit stream data, the instruction data being arranged so as to be extracted after the program unit is extracted;
    a storing section configured to store the extracted program unit in a memory;
    a second extracting section configured to extract the instruction data from the bit stream data;
    a reading section configured to read and execute at least one of the program unit and a part thereof in the memory on the basis of the instruction of the instruction data; and
    a displaying section configured to display the bit stream data and a result of the execution.

2. The stream reproducing apparatus according to claim 1, wherein the instruction data includes at least one of an instruction for releasing an execution standby state of the program unit and an instruction for saving a code of the program unit on a data storage medium.

3. The stream reproducing apparatus according to claim 1, wherein the program unit includes at least one of a function for performing control related to display of the bit stream data, a function for performing control related to recording of the bit stream data, and a function for performing control related to user interface.

4. A stream reproducing apparatus, comprising:
    a first extracting section configured to extract a program unit from bit stream data stored with the program unit to be used for carrying out a processing related to the bit stream data and instruction data for providing an instruction to the program unit, the program unit and the instruction data being multiplexed on the bit stream data, the program unit having a name which indicates said program unit and the instruction data including the name;
    a storing section configured to store the extracted program unit in a memory;
    a second extracting section configured to extract the instruction data from the bit stream data;

a reading section configured to read and execute the program unit or part thereof in the memory on the basis of the instruction and the name included in the instruction data; and a displaying section configured to display the bit stream data and a result of the execution.

5. The stream reproducing apparatus according to claim 1, wherein the instruction data includes at least one of an instruction for releasing an execution standby state of the program unit and an instruction for saving a code of the program unit on a data storage medium.

6. The stream reproducing apparatus according to claim 1, wherein the program unit includes at least one of a function for performing control related to display of the bit stream data, a function for performing control related to recording of the bit stream data, and a function for performing control related to user interface.

7. A storage medium producing apparatus, comprising:

a first determining section configured to determine a program unit to be used for carrying out a processing related to bit stream data;

a second determining section configured to determine instruction data for providing an instruction to the program unit, which is to be embedded in the bit stream data in accordance with a timing for executing the program unit;

an arranging section configured to arrange the program unit and the instruction data in the bit stream data such that the program unit and the instruction data are multiplexed on the bit stream data, the instruction data being arranged so as to be extracted after the program unit is extracted; and a storing section configured to store on a storage medium the bit stream data in which the program unit and the instruction data are arranged.

8. The storage medium producing apparatus according to claim 7, wherein the instruction data includes at least one of an instruction for releasing an execution standby state of the program unit and an instruction for saving a code of the program unit on a data storage medium.

9. The apparatus according to claim 7, wherein the program unit includes at least one of a function for performing control related to display of the bit stream data, a function for performing control related to recording of the bit stream data, and a function for performing control related to user interface.

10. A storage medium reproducing apparatus, comprising:

a first extracting section configured to extract a program unit from bit stream data stored on a storage medium with the program unit to be used for carrying out a processing related to the bit stream data and instruction data for providing an instruction to the program unit, the program unit and the instruction data being multiplexed on the bit stream data, the instruction data being arranged so as to be extracted after the program unit is extracted;

a storing section configured to store the extracted program unit in a memory;

a second extracting section configured to extract the instruction data from the bit stream data;

a reading section configured to read and execute at least one of the program unit and a part thereof in the memory on the basis of the instruction of the instruction data; and a displaying section configured to display the bit stream data and a result of the execution.

11. The storage medium reproducing apparatus according to claim 10, wherein the instruction data includes at least one of an instruction for releasing an execution standby state of the program unit and an instruction for saving a code of the program unit on a data storage medium.

12. The storage medium reproducing apparatus according to claim 10, wherein the program unit includes at least one of a function for performing control related to display of the bit stream data, a function for performing control related to recording of the bit stream data, and a function for performing control related to user interface.

13. A data generating apparatus, comprising:

a first determining section configured to determine a program unit to be used for carrying out a processing related to bit stream data;

a second determining section configured to determine instruction data for providing an instruction to the program unit, which is to be embedded in the bit stream data in accordance with a timing for executing the program unit; and an arranging section configured to arrange the program unit and the instruction data in the bit stream data such that the program unit and the instruction data are multiplexed on the bit stream data, the instruction data being arranged so as to be extracted after the program unit is extracted.

* * * * *